United States Patent [19]

Carver

[11] 4,415,768
[45] Nov. 15, 1983

[54] TUNING APPARATUS AND METHOD
[76] Inventor: Robert W. Carver, 330 Avenue A, Snohomish, Wash. 98290
[21] Appl. No.: 268,084
[22] Filed: May 28, 1981
[51] Int. Cl.³ .............................................. H04H 5/00
[52] U.S. Cl. .......................................... 381/10; 381/1
[58] Field of Search ....................... 455/65; 358/905; 179/1 G, 1 GJ, 1 GP, 1 GQ, 1 P

[56] References Cited

U.S. PATENT DOCUMENTS

| | | | |
|---|---|---|---|
| 2,227,057 | 12/1940 | Blumlein | 358/905 X |
| 3,124,649 | 3/1964 | Pflager et al. | 179/1 GP |
| 3,943,293 | 3/1976 | Bailey | 179/1 GQ |
| 4,029,906 | 6/1977 | Takahashi | 179/1 GJ |
| 4,032,717 | 6/1977 | Mallon | 179/1 GJ |
| 4,047,224 | 9/1977 | Yamaguti | 358/905 |
| 4,216,353 | 8/1980 | Fish, Jr. | 179/1 GJ |
| 4,303,800 | 12/1981 | De Freitas | 179/1 G |

FOREIGN PATENT DOCUMENTS 52-20801  2/1977  Japan ................................. 179/1 G

*Primary Examiner*—R. J. Hickey
*Attorney, Agent, or Firm*—Hughes, Barnard & Cassidy

[57] ABSTRACT

Right and left FM stereo signals are combined to form an L plus R value and subtracted to produce an L minus R value. The L minus R value is passed through a high-pass filter which mutes the high frequency portion of the signal only when the amplitude of the signal is low. This is recombined with the L plus R signal to provide a 2L output. A similar process is followed to produce a 2R output.

The two left and right outputs are combined and then passed through a mono to stereo converter to produce two phase-shifted signals. These are in turn selectively delayed and passed through respective band pass filters to mute signal portions between approximately five hundred to one thousand Hz. The combined signals, prior to being converted back to a stereo signal are directed through a second band pass filter to mute the frequency portions other than the five hundred to one thousand Hz level, and these are recombined with the rest of the signal.

To diminish the harmful effect of reflected radio waves, the left input is directed to several time delay devices, each having a different time delay, and these outputs are directed to a coincidence circuit that compares the several time delay signals with the main signal. When the coincidence circuit detects the similarity of one of the time delay signals with a component in the main input, the coincidence circuit produces a similar time delay signal, which is inverted and fed back to the main output to cancel out the reflected component in the main output.

5 Claims, 3 Drawing Figures

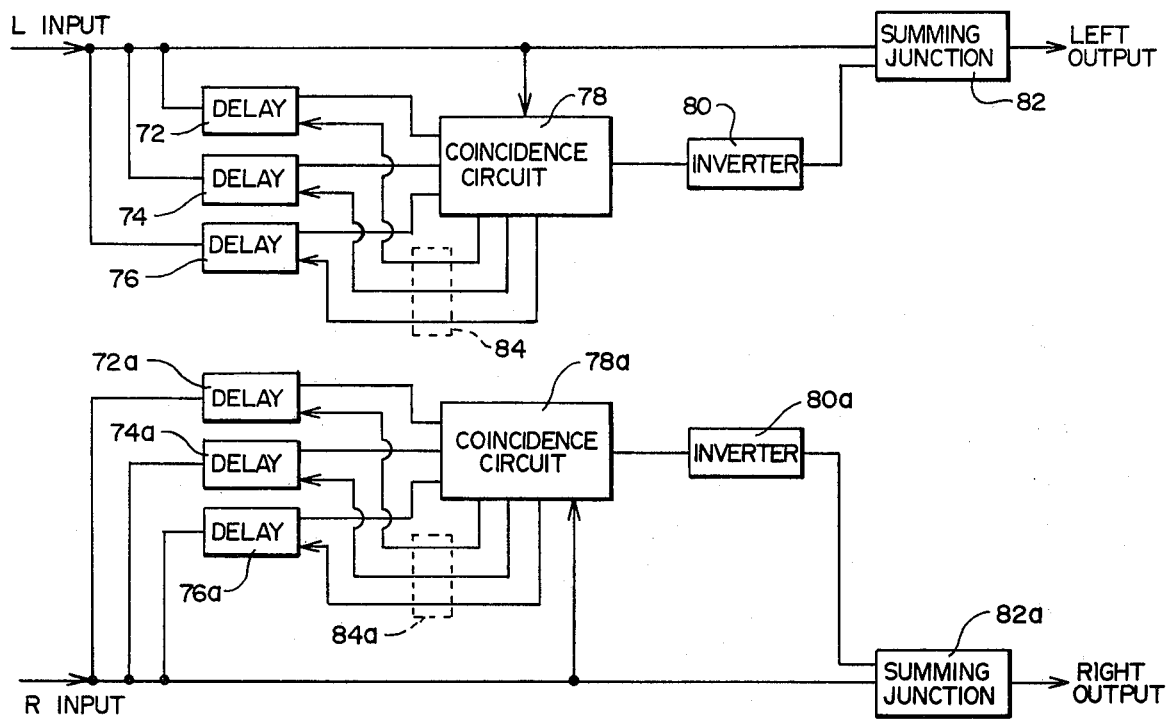

TUNING APPARATUS AND METHOD

BACKGROUND OF THE INVENTION

FM stereo was developed prior to the time that the concept of stereo music was intended to be adapted to FM radio. To make FM stereo compatable with existing FM monaural radio equipment, the output was flawed with respect to noise and distortion, particularly multipath distortion. It is an object of the present invention to improve the quality of FM stereo.

BRIEF DESCRIPTION OF THE DRAWING

FIG. 3 is a schematic drawing of a third part of the present invention.

DESCRIPTION OF THE PREFERRED EMBODIMENT

Figure 1:
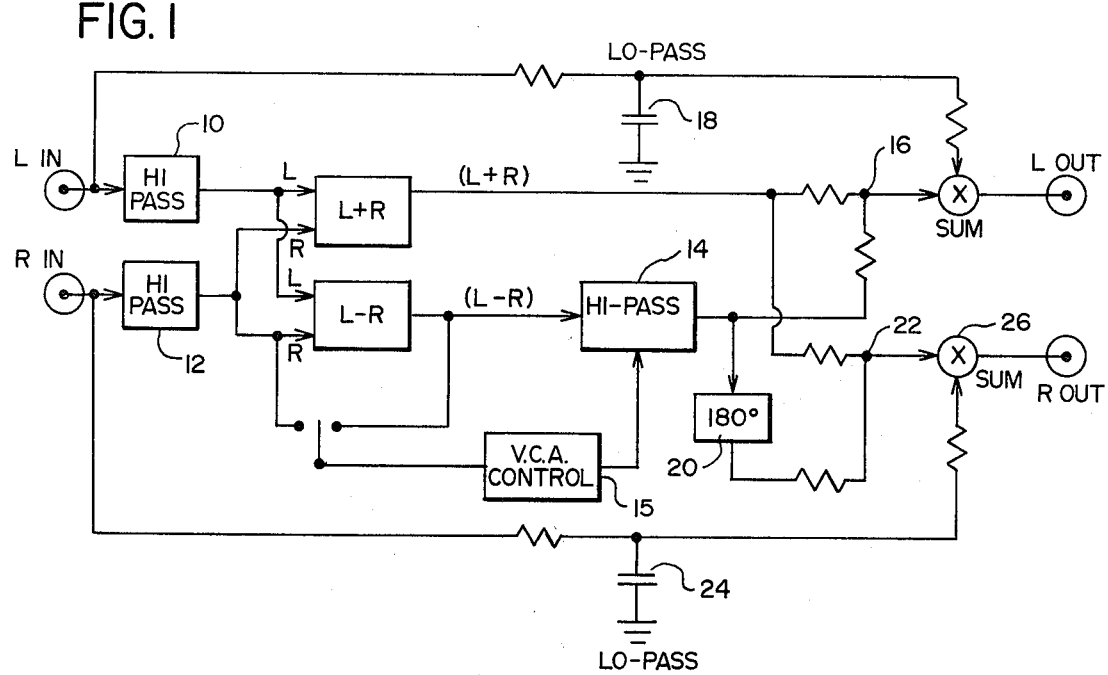
FIG. 1 is a schematic circuit diagram of the first part of the present invention.

With reference to FIG. 1, the FM stereo signals pass into an FM detector which produces left and right stereo signals. The left signal goes into a high pass filter 10 which passes the frequencies of 500 Hz and above. The output from the left high-pass filter 10 goes to a summing junction L+R. Likewise, the right output passes into a right high-pass filter 12 and its output goes to the same summing junction L+R.

To produce an L−R value, the output from the left high-pass filter is transmitted directly to a junction identified as L−R. The output from the right high-pass filter is directed to the L−R junction, where the R signal is subtracted from the L signal. As it turns out, the L+R output is very clean, noise free and almost totally immune to multi-path distortion. However, the L−R signal is rather noisy, has greater distortion and is more prone to multi-path distortion. For this reason, the L−R output is directed to a voltage controlled, dynamically variable high-pass filter 14, having a control circuit 15. This filter is arranged so that when the amplitude of the signal is rather high, it passes the high frequency tones (e.g. one KHz and above). However, when the amplitude of the signal is relatively low, the high frequencies are muted to a substantial degree. The effect of this is that when the signal is strong (so that the music produced therefrom is relatively loud), the noise and distortion is masked. However, when the signal is weak (and the sound produced thereby is weak), the noise and distortion in the higher frequencies is muted.

The output from the L+R amplifier and the output from the L−R voltage controlled amlifier are combined at the L junction 16 to produce a value which is substantially equal to the left signal (less the value of the low frequency portion of the signal). To add back the low frequency portion of the signal, the left signal from the FM detector is passed through a low pass filter 18 to pass the frequencies below 500 Hz, and this is directed to a summing junction to produce the left output.

Substantially the same process is followed with respect to the right main signal to produce the right output. Thus, the output from the high pass filter 14 is inverted at 20 and directed to a summing junction 22. The output from the L+R junction is also directed to the function 22. This produces the R value, which is substantially the value of the right output. To restore completely the right output, the right output from the FM detector is passed through a low pass filter 24 to restore the frequencies below 500 Hz and directed to the summing junction 26 along with the R output, and this produces the right output.

Figure 2:
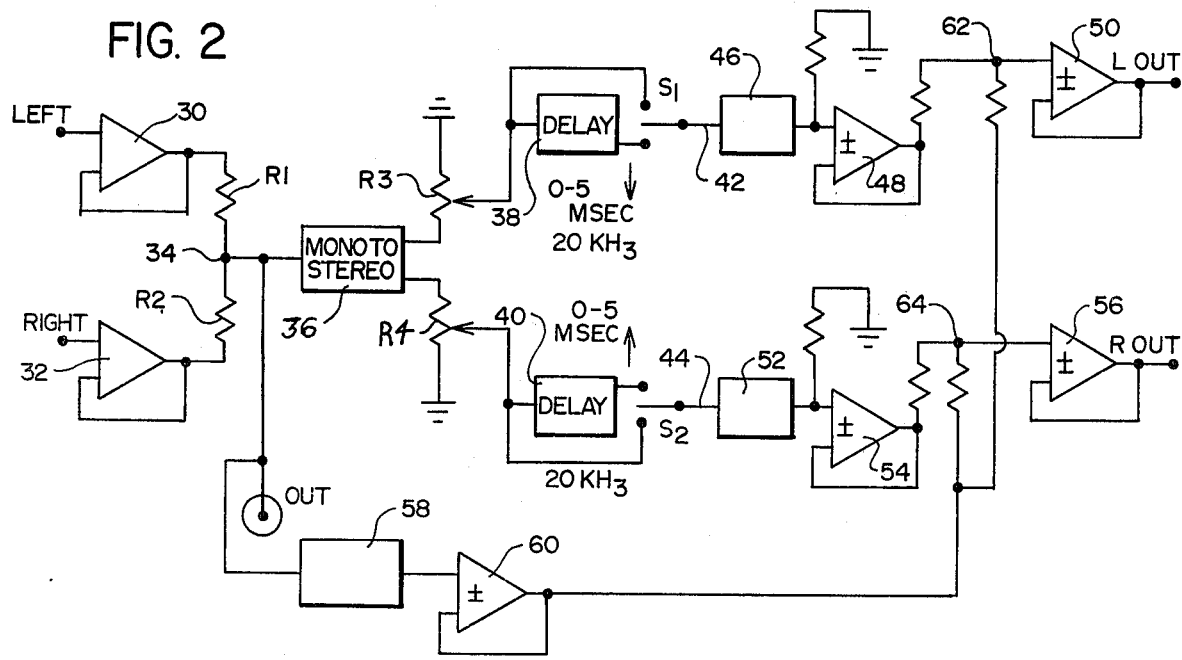
FIG. 2 is a schematic drawing of a second part of the present invention.

References is now made to FIG. 2. There are left and right input. These can be derived directly from the FM detector, or derived from the outputs of the circuitry shown in FIG. 1. The left and right outputs are passed through two buffer unity gain amplifiers 30 and 32, respectively. The output from the amplifiers 30 and 32 pass through respective resistors R1 and R2 to be combined at point 34 and directed to a mono to stereo converter 36.

This converter 36 produces two separate signals, one of which is delayed with respect to the other, so as to simulate a stereo signal. The output from 36 is a stereo signal, with the left signal being passed through a left variable resistor R3 and the right signal being passed through a right variable resistor R4. Each of these two signals is passed through a respective delay mechanism 38 and 40, respectively, which can be used to produce a further phase shift. Alternatively, each of the delay mechanisms 38 and 40 can be bypassed by manipulating respective switches 42 and 44.

The left output is directed to a left band pass filter 46 which substantially diminishes the signal portion between approximately 500 to 1000 Hz, with the output from the filter 46 going through a buffer amplifier 48 and thence to a second buffer amplifier 50.

The right output from R4, is selectively passed through the delay 40 (or bypasses the delay 40) and then through a right band pass filter 52, which likewise mutes the frequency portions between 500 to 1000 Hz. The output from the band pass filter 52 is directed to a buffer amplifier 54 and then to a second buffer amplifier 56.

The reason for muting the middle frequencies by means of the bypass filters 46 and 52 is that the human ear is particularly sensitive to these frequencies, since these correspond to the fundamental tones in the human voice. The manipulating of the signals has a tendency to introduce distortion, and by muting these middle frequencies, the distortion becomes much less noticeable to the human ear.

To restore the overall quality of the signal, the output from the junction 34 is directed through a band pass filter 58 that passes the frequencies between 500 to 1000 Hz, while muting the other frequencies. The output from the filter 58 is directed through a buffer amplifier 60, the output of which is directed to two places:

a. first as summing junction 62 between the filters 48 and 50, b. to a summing junction 64 between the buffer amplifiers 54 and 56.

The overall effect produced by the circuitry of FIG. 2 is that the stereo components are produced at the L and R outputs. With regard to the output in the middle frequency range (500 to 1000 Hz), this would normally be present when the human voice is part of the audio signal. However, in stereo, the human voice quite often appears to be at a center location. Thus, since the fundamental tones of the human voice would be reproduced monaurally the overall stereo effect is still achieved.

Reference is now made to FIG. 3. There is a left and a right input, L and R, respectively. These inputs can be from the FM detector, from the output of the circuitry of FIG. 1 or from the output of the circuitry of FIG. 2.

The left input is directed to a plurality of time delay components, designated 72, 74 and 76. For example, the delay at 72 could be 5-10 microseconds, at 74 10-20 microseconds, and at 76 20-50 microseconds. The outputs from the three time delay components 72, 74 and 76 are directed to a coincidences circuit 78, and the main left input signal is also directed to the coincidence circuit 78. The coincidence circuit 78 compares the pattern of the main left input signal with the patterns of the three delayed outputs from the components 72, 74 and 76. When the coincidence circuit 78 detects substantial similarity between any one of the delayed signals from 72, 74 and 76 with the output from the main left signal, the circuit 78 produces an output corresponding to the circuit portions that have substantial similarity. The output from the coincidence circuit 78 is inverted 180° at the inverter 80 and directed to a summing junction 82. Likewise, the main left input signal is directed to the summing junction 82.

To explain the significance of the circuitry of FIG. 3, let it be assumed that the main left input signal results from the direct left radio wave and also a reflected wave which is reflected from a building. The signal reflected from the building will be delayed by a certain time period and will appear similar to the main left signal, but slightly phase shifted. The reflected signal will coincide generally with one of the delayed signals from the components 72, 74 and 76. Thus, the coincidence circuit 78 in effect detects the delayed reflected signal portion from the main left input, isolates that signal portion and feeds it to the inverter 80. The inverted signal is directed back into the main left input signal at the summing junction 82 to in effect cancel out the reflected signal from the building. Thus, the left output has in effect eliminated this distortion due to the reflected signal. There is also control feedback circuitry at 84 that adjusts the time delay to optimize cancellation.

The other half of the circuit diagram of FIG. 3 is substantially the same as the upper half of that circuit, so no description will be added. However, corresponding numerical designations will be given, with an "a" suffix distinguishing the components of the lower half of the circuit.

What is claimed is:

1. An apparatus adapted to improve reproduction of a signal, such as an FM stereo signal, comprising:
   a. first means to receive a signal input means and produce a first delayed signal output,
   b. second means to receive said signal input means and said first delayed signal output and to compare these to produce a second delayed signal output corresponding to portions of said signal input means and said first delayed signal output that correspond to one another,
   c. third means to invert said second delayed signal output and combine the same with said signal input means to produce an output signal,
   d. control feedback means to control the delay of the first means to coincide more closely with the corresponding signal portion in the signal input means, and
   e. said first means comprising a plurality of delay means to produce a plurality of first delayed signal output portions, each having different delayed increments.

2. An apparatus adapted to improve FM stereo, comprising:
   a. first means to combine right and left signals to provide a first signal output,
   b. second means to subtract said right and left signals to produce a second signal output,
   c. third means to mute a high frequency portion of said second signal output when the second signal output is at a low amplitude and to pass said high frequency portions when said second signal output is at a high amplitude, so as to provide a modified second signal output,
   d. fourth means to recombine said modified second signal output with said first signal output to provide a third and fourth signal output,
   e. fifth means to receive third and fourth signal outputs and produce a first and second delayed signal output,
   f. sixth means to receive said third and fourth signal input means and said first and second delayed signal outputs and to compare these to produce a third and fourth delayed signal outputs corresponding to portions of said third and fourth signal outputs and said first and second delayed signal outputs that correspond to one another,
   g. seventh means to invert said third and fourth delayed signal outputs and combine the same with said third and fourth signal outputs to produce a fifth and sixth signal.

3. An apparatus adapted to improve FM stereo, comprising:
   a. first means to receive an input signal means and produce first and second stereo signals,
   b. second means to mute middle frequency portions of said first and second stereo signals, while passing other frequency portions, to produce modified first and second stereo signals,
   c. third means to receive said input signal means and mute frequency portions other than said middle frequency portions to produce a third signal,
   d. fourth means to combine said third signal with said first and second modified signals to produced first and second stereo outputs,
   e. fifth means to receive said first and second stereo outputs and produce a first and second delayed signal output,
   f. sixth means to receive said first and second stereo outputs and said first and second delayed signal output and to compare these to produce third and fourth delayed signal output corresponding to portions of said first and second stereo outputs and said first and second delayed signal output that correspond to one another,
   g. seventh means to invert said third and fourth delayed signal outputs and combine the same with said first and second stereo outputs to produce third and fourth stereo outputs.

4. A method adapted to improve FM stereo, comprising:
   a. combining a right and a left signal to provide a first signal output,
   b. subtracting said right and left signals and producing a second signal output,
   c. muting a high frequency portion of said second signal output when the second signal output is at a low amplitude and passing said high frequency portions when said second signal output is at a high amplitude, so as to provide a modified second signal output,
   d. recombining said modified second signal output with said first signal output to provide a third and fourth signal output,
   e. receiving third and fourth signal outputs and producing a first and second delayed signal output, f. receiving said third and fourth signal input means and said first and second delayed signal outputs and comparing these to produce a third and fourth delayed signal outputs corresponding to portions of said third and fourth signal outputs and said first and second delayed signal outputs that correspond to one another, g. inverting said third and fourth delayed signal outputs and combine the same with said third and fourth signal outputs to produce a fifth and sixth signal.

5. A method adapted to improve FM stereo, comprising:

a. receiving an input signal means and producing first and second stereo signals, b. muting middle frequency portions of said first and second stereo signals, while passing other frequency portions, to produce modified first and second stereo signals, c. receiving said input signal means and muting frequency portions other than said middle frequency portions to produce a third signal, d. combining said third signal with said first and second modified signal to produce first and second stereo outputs, e. receiving said first and second stereo outputs and producing a first and second delayed signal output, f. receiving said first and second stereo outputs and said first and second delayed signal output and comparing these to produce third and fourth delayed signal output corresponding to portions of said first and second stereo outputs and said first and second delayed signal output that correspond to one another, g. inverting said third and fourth delayed signal outputs and combining the same with said first and second stereo outputs to produce third and fourth stereo outputs.

* * * * *